No. 894,770. PATENTED JULY 28, 1908.
W. M. WOOD.
MEASURING INSTRUMENT.
APPLICATION FILED MAY 13, 1907.
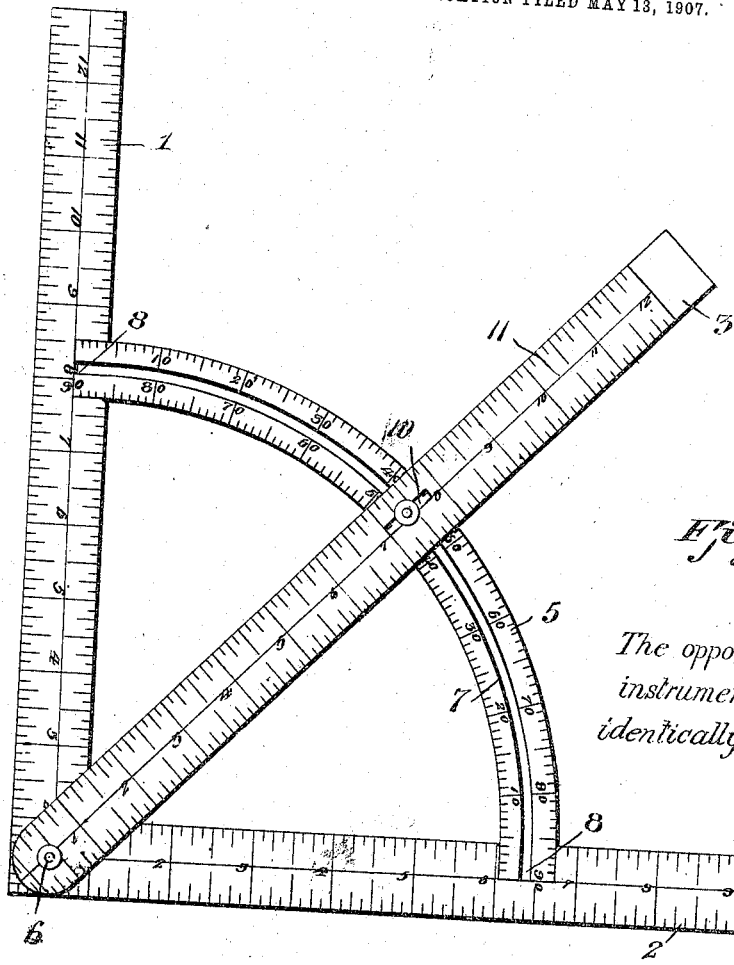
Fig. 1.
The opposite side of the instrument is marked identically with this side
Fig. 2.
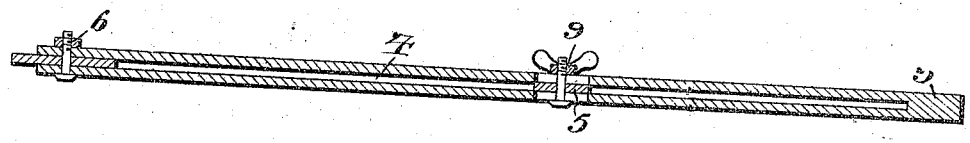
Witnesses
Frank B. Hoffman.
W. H. Clarke.
Inventor
William M. Wood.
By Victor J. Evans
Attorney

UNITED STATES PATENT OFFICE.

WILLIAM M. WOOD, OF CULLMAN, ALABAMA.

MEASURING INSTRUMENT.

No. 894,770.

Specification of Letters Patent.

Patented July 28, 1908.

Application filed May 13, 1907. Serial No. 373,360.

*To all whom it may concern:*

Be it known that I, WILLIAM M. WOOD, a citizen of the United States, residing at Cullman, in the county of Cullman and State of Alabama, have invented new and useful Improvements in Measuring Instruments, of which the following is a specification.

This invention relates to measuring instruments.
The object of the invention is to combine in a measuring instrument the principles of a square and circle in such manner that the device may be used in marking straight and right angles; ascertaining and marking angles of any number of degrees; fitting and marking rafters, braces and all diagonal or angular work wherein the angles are complementary; determining and correcting the variation of a rafter or brace from its true position; finding the length of a rafter, brace or perpendicular by computing from the known dimension or dimensions; marking one end of a rafter by using the markings of the other end; ascertaining the shape or angles of roofs; and determining other measurements of a similar nature.

With the foregoing and other minor objects in view, which will appear as the description proceeds, the invention consists in the combination and arrangement of parts and in the details of constructions hereinafter described and claimed as a practical embodiment thereof.

In the accompanying drawing, forming part of this specification, Figure 1 is a plan view of a measuring instrument constructed in accordance with the invention. Fig. 2 is a section taken longitudinally through the pivotally mounted or radial arm.
Like reference numerals indicate corresponding parts in the different views.

The improved measuring instrument comprises, preferably, two arms, 1 and 2, which are integral, or connected together in any suitable manner and are disposed at a right angle with respect to each other; a radial arm 3 having therein a longitudinal slot 4, into which said angular arms 1 and 2 are fitted at their point of intersection, said radial and angular arms being pivotally connected with each other in any suitable manner; a segmental guide arm 5, formed therewith, said angular arms 1 and 2 being curved on the arc of a circle, having the pivot point 6 of the radial arm 3, as its center, said curved guide arm 5 extending through the longitudinal slot 4 of the radial arm 3 and being formed with a continuous longitudinal slot 7, which extends partly across each of the angular arms 1 and 2, as shown at 8; and an adjusting or thumb screw 9 extending through what may be termed a sight slot 10 in the radial arm 3, and through the longitudinal slot 7 in the guide arm 5. The length of the sight slot 10, in the radial arm 3, is about equal to the width of the guide arm 5, so as to permit the scale marks on said guide arm to be perceived clearly through said sight slot. One side of the sight slot 10 is disposed upon the radial line 11, extending longitudinally through the center of the radial arm 3. Each of the arms 1, 2, 3, and 5 is provided on each side with two sets of scale marks, one set being disposed on each side of the longitudinal center of the arm, as indicated clearly in Fig. 1, and a single series of numerals serving for the two sets of scale marks on each side of each arm.

It will be understood from the foregoing that the arrangement of the scale marks indicated in Fig. 1, is duplicated upon the opposite side of the measuring instrument, in order that either side of said instrument may be utilized in measuring various lines or angles, as will be apparent to those skilled in the art to which the invention relates.

The improved instrument of this invention is strong, simple, durable, and inexpensive in construction, as well as thoroughly efficient in operation. It combines the principles of the square in such manner that various angles or degrees of a circle may be readily ascertained.

The guide arm 5 has its opposite ends integral with the angular arms 1 and 2 and said ends extend part way into said arms as indicated at 8, and the slot 7 of said guide arm which extends from end to end thereof, permits of the radial arm 3 being swung upon its pivot until it entirely incloses one or the other of the angular arms, this action is accomplished by the arm 3 being of a length longer than the angular arms 1 and 2, and said slot of the radial arm stops short of its free end so as to inclose one or the other of the free ends of the said angular arms, this operation being accomplished without the necessity of removing the thumb screw 9 entirely from the sight slot 10 or longitudinal slot 7.

The various methods of using the improved measuring instrument will be apparent to those familiar with the art to which it relates, and further explanation of such uses is, therefore, deemed unnecessary.

In its particular combination and arrangement of parts, and in its details of construction, the device of this invention constitutes an improvement over prior devices intended for the same purpose.

In the use of the improved measuring instrument the radial arm 3, in the slot 4 of which the square formed by the arms 1—2 is pivoted, may be utilized as a straight edge to engage the side of a blank that is to be measured and marked, one or the other arms of the square being placed flat upon the blank to afford a straight edge whereby the desired marking may be made. It will be seen that if for instance the two ends of the rafter are to be marked alike, for cutting off at the same angle, the instrument, after one end has been marked, may be simply reversed and adjusted at the opposite end of the rafter which may then be marked to correspond with the first end. The opposite sides of the improved instrument being graduated or marked in an identical manner, it is obvious that the use of said instrument will be greatly facilitated, and the range of its utility increased.

Minor changes in the embodiment of invention illustrated and described, may be made within the scope of the following claims, without departing from the spirit of the invention, or sacrificing any of its advantages.

Having thus fully described the invention, what is claimed as new is:—

The herein described measuring instrument comprising two arms at an angle one to the other, a slotted radial arm having one end pivoted to the intersections of the angular arms, the opposite or free end of the radial arm being unslotted, a curved guide arm having its opposite ends extending part way into the angular arms and having a continuous slot therein which extends from end to end of the guide arm, said radial arm having a longitudinal opening therein, a thumb screw connected to said opening and to the slot of the curved arm, said radial arm being constructed of a length longer than said angular arms and serving with the unslotted end thereof to inclose the bodies and ends of one or the other of said radial arms, substantially as specified.

In testimony whereof, I affix my signature in presence of two witnesses.

WILLIAM M. WOOD.

Witnesses:
   J. B. BROWN,
   GAULT CAMPBELL.